US012649812B2

(12) United States Patent
Homma

(10) Patent No.: US 12,649,812 B2
(45) Date of Patent: Jun. 9, 2026

(54) RESIN COMPOSITION, OPTICAL FIBER, AND METHOD FOR PRODUCING OPTICAL FIBER

(71) Applicant: SUMITOMO ELECTRIC INDUSTRIES, LTD., Osaka (JP)

(72) Inventor: Yuya Homma, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 491 days.

(21) Appl. No.: 18/029,163

(22) PCT Filed: Aug. 2, 2021

(86) PCT No.: PCT/JP2021/028645
§ 371 (c)(1),
(2) Date: Mar. 29, 2023

(87) PCT Pub. No.: WO2022/074914
PCT Pub. Date: Apr. 14, 2022

(65) Prior Publication Data
US 2023/0365736 A1 Nov. 16, 2023

(30) Foreign Application Priority Data
Oct. 5, 2020 (JP) ................................ 2020-168366

(51) Int. Cl.
*C08F 290/06* (2006.01)
*C03C 25/1065* (2018.01)
(Continued)

(52) U.S. Cl.
CPC ...... *C08F 290/067* (2013.01); *C03C 25/1065* (2013.01); *C03C 25/326* (2013.01); *G02B 6/02395* (2013.01)

(58) Field of Classification Search
CPC . C08F 290/067; C03C 25/106; C03C 25/326; G02B 6/02395
See application file for complete search history.

(56) References Cited

U.S. PATENT DOCUMENTS

| | | | | |
|---|---|---|---|---|
| 9,447,295 | B2 * | 9/2016 | Guenther ............... | C09D 11/30 |
| 10,745,576 | B2 * | 8/2020 | Fleckenstein ............ | C09D 4/00 |

(Continued)

FOREIGN PATENT DOCUMENTS

| | | | | |
|---|---|---|---|---|
| AU | 2018219661 A1 * | 8/2019 | ............ | C09D 11/30 |
| CA | 3053037 A1 * | 8/2018 | ............ | C09D 11/30 |

(Continued)

OTHER PUBLICATIONS

AU-2018219661-A1 English Language Text (Year: 2019).*
(Continued)

*Primary Examiner* — Peter Radkowski
(74) *Attorney, Agent, or Firm* — Faegre Drinker Biddle & Reath LLP

(57) ABSTRACT

A resin composition for primary coating of an optical fiber includes a photopolymerizable compound and a photopolymerization initiator. The photopolymerizable compound includes a urethane oligomer and an N-vinyl compound represented by the formula (I) below:

[Chemical Formula 1]

(I)

(Continued)

(where R represents an alkyl group having 1 to 5 carbon atoms).

8 Claims, 1 Drawing Sheet

(51) Int. Cl.

| | |
|---|---|
| ***C03C 25/326*** | (2018.01) |
| ***G02B 6/02*** | (2006.01) |

(56) References Cited

U.S. PATENT DOCUMENTS

| | | | | |
|---|---|---|---|---|
| 2001/0025062 | A1* | 9/2001 | Szum | C03C 25/106 522/96 |
| 2016/0193852 | A1* | 7/2016 | Guenther | C09D 11/101 347/102 |
| 2018/0364437 | A1 | 12/2018 | Tachibana et al. | |
| 2019/0375954 | A1* | 12/2019 | Fleckenstein | C08L 75/14 |
| 2020/0247932 | A1* | 8/2020 | Share | C08G 18/672 |

FOREIGN PATENT DOCUMENTS

| | | | | | |
|---|---|---|---|---|---|
| CN | 110256902 | A | * | 9/2019 | C09D 11/30 |
| EP | 3033399 | B1 | * | 10/2017 | C09D 11/101 |
| ES | 2655486 | T3 | * | 2/2018 | C09D 11/106 |
| GB | 2561984 | A | * | 10/2018 | C09D 11/38 |
| GB | 2562169 | A | * | 11/2018 | C09D 11/38 |
| JP | 2001302742 | A | * | 10/2001 | |
| JP | 2002338640 | A | * | 11/2002 | |
| JP | 2009197163 | A | * | 9/2009 | |
| JP | 2013-501125 | A | | 1/2013 | |
| JP | 2013-136783 | A | | 7/2013 | |
| JP | 2014-114208 | A | | 6/2014 | |
| JP | 2012111674 | A | * | 6/2014 | |
| JP | 2017141125 | A | * | 8/2017 | |
| JP | 2017141126 | A | * | 8/2017 | |
| KR | 20190112120 | A | * | 10/2019 | C09D 11/30 |
| WO | WO-2008076297 | A1 | * | 6/2008 | C08G 18/755 |
| WO | WO-2008076302 | A1 | * | 6/2008 | C03C 25/10 |
| WO | WO-2011049607 | A1 | * | 4/2011 | C08G 18/246 |
| WO | WO-2015022228 | A1 | * | 2/2015 | C09D 11/101 |
| WO | WO-2018146259 | A1 | * | 8/2018 | C08L 67/06 |
| WO | WO-2019159977 | A1 | * | 8/2019 | C08F 290/06 |
| WO | WO-2020064523 | A1 | * | 4/2020 | B29C 64/124 |

OTHER PUBLICATIONS

CN-110256902-A English Language Text (Year: 2019).*
EP-3033399-B1 English Language Text (Year: 2017).*
ES-2655486-T3 English Language Text (Year: 2018).*
GB-2561984-A English Language Text (Year: 2018).*
GB-2562169-A English Language Text (Year: 2018).*
JP-2001302742-A English Language Text (Year: 2001).*
JP-2002338640-A English Language Text (Year: 2002).*
JP-2009197163-A English Language Text (Year: 2009).*
JP-2012111674-A English Language Text (Year: 2012).*
JP-2017141125-A English Language Text (Year: 2017).*
JP-2017141126-A English Language Text (Year: 2017).*
KR-20190112120-A English Language Text (Year: 2019).*
WO-2008076297-A1 English Language Text (Year: 2008).*
WO-2008076302-A1 English Language Text (Year: 2008).*
WO-2011049607-A1 English Language Text (Year: 2011).*
WO-2015022228-A1 English Language Text (Year: 2015).*
WO-2018146259-A1 English Language Text (Year: 2018).*
WO-2019159977-A1 English Language Text (Year: 2019).*
WO-2020064523-A1 English Language Text (Year: 2020).*
CA-3053037-A1 English Language Text (Year: 2018).*

* cited by examiner

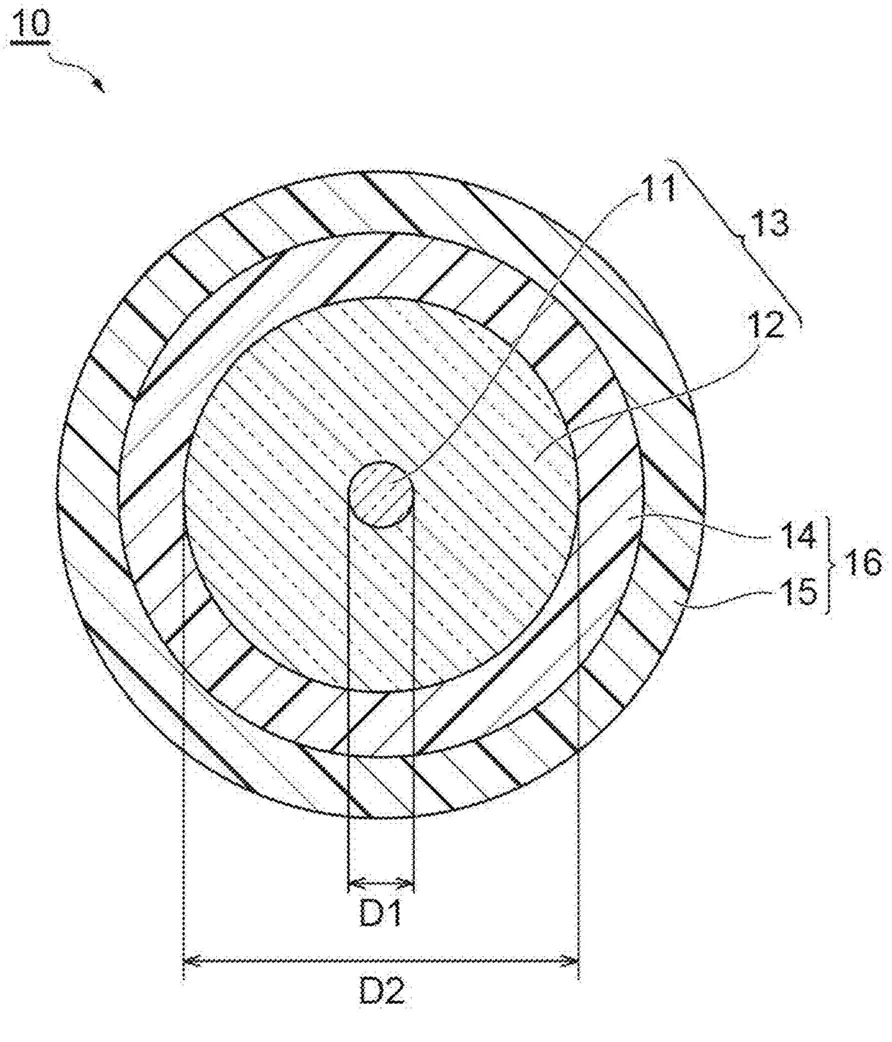
10
11
13
12
14
16
15
D1
D2

RESIN COMPOSITION, OPTICAL FIBER, AND METHOD FOR PRODUCING OPTICAL FIBER

TECHNICAL FIELD

The present disclosure relates to a resin composition for primary coating of an optical fiber, an optical fiber, and a method for producing an optical fiber.

This application claims priority based on Japanese Patent Application No. 2020-168366 filed on Oct. 5, 2020, the entire contents of which are incorporated herein by reference.

BACKGROUND ART

Generally, an optical fiber includes a coating resin layer for protecting a glass fiber, which is an optical transmission medium. The coating resin layer is composed of two layers, for example, a primary resin layer in contact with the glass fiber and a secondary resin layer formed on the outer layer of the primary resin layer. As a resin composition for primary coating of an optical fiber, for example, resin compositions for a primary resin layer described in PTLs 1 to 6 are known.

CITATION LIST

Patent Literature

PTL 1: JP 2009-197163 A
PTL 2: JP 2012-111674 A
PTL 3: JP 2013-136783 A
PTL 4: JP 2013-501125 A
PTL 5: JP 2014-114208 A
PTL 6: JP 2017-141125 A

SUMMARY OF INVENTION

A resin composition for primary coating of an optical fiber according to an aspect of the present disclosure, the resin composition includes a photopolymerizable compound and a photopolymerization initiator. The photopolymerizable compound includes a urethane oligomer and an N-vinyl compound represented by following formula (I).

An optical fiber according to an aspect of the present disclosure includes a glass fiber including a core and a cladding, a primary resin layer coating the glass fiber so as to be in contact with the glass fiber, and a secondary resin layer coating the primary resin layer. The primary resin layer includes a cured product of the resin composition.

A method for producing an optical fiber according to an aspect of the present disclosure, the method includes applying the resin composition to an outer periphery of a glass fiber including a core and a cladding, and curing the resin composition by irradiation with ultraviolet rays after the applying.

BRIEF DESCRIPTION OF DRAWINGS

FIG. 1 is a schematic cross-sectional view showing an example of an optical fiber according to an embodiment of the present disclosure.

DESCRIPTION OF EMBODIMENTS

Problems to be Solved by Present Disclosure

The resin composition for primary coating tends to have a slower curing rate than the resin composition for secondary coating, and it is required to improve the curing rate of the resin composition for primary coating in order to improve the productivity of optical fibers. In addition, if the curing of the resin composition for primary coating is insufficient, defects such as voids may occur in the formed primary resin layer, or delamination may occur between the glass fiber and the primary resin layer, which is likely to cause an increase in transmission loss, particularly an increase in transmission loss at low temperatures.

An object of the present disclosure is to provide a resin composition having a high curing rate and capable of forming a resin layer suitable for primary coating of an optical fiber, and an optical fiber having excellent productivity.

Advantageous Effects of Present Disclosure

According to the present disclosure, it is possible to provide a resin composition having a high curing rate and capable of forming a resin layer suitable for primary coating of an optical fiber, and an optical fiber having excellent productivity.

Description of Embodiments of Present Disclosure

First, contents of embodiments of the present disclosure will be listed and described. A resin composition for primary coating of an optical fiber according to an aspect of the present disclosure includes a photopolymerizable compound and a photopolymerization initiator. The photopolymerizable compound includes a urethane oligomer and an N-vinyl compound represented by following formula (I).

Such a resin composition has a high curing rate, and can suppress defects in the formed primary resin layer and delamination between the glass fiber and the primary resin layer. Therefore, a resin layer suitable for primary coating of an optical fiber can be formed, and productivity of the optical fiber can be improved. An optical fiber including a primary resin layer formed using such a resin composition can suppress an increase in transmission loss at low temperatures.

From the viewpoint of further improving the curing rate of the resin composition, the N-vinyl compound represented by the formula (I) may include an N-vinyl methyl oxazolidinone.

From the viewpoint of further improving the curing rate of the resin composition and appropriately adjusting the viscosity of the resin composition, a content of the N-vinyl compound represented by the formula (I) may be 1 part by mass to 30 parts by mass based on 100 parts by mass of a total amount of the resin composition.

From the viewpoint of further improving the curing rate of the resin composition, the urethane oligomer may have, at at least one end of a urethane bond, at least one photopolymerizable group selected from the group consisting of a (meth)acrylamide group and a (meth)acryloyloxy group.

From the viewpoint of adjusting the Young's modulus of the primary resin layer, the photopolymerizable compound may further includes a (meth)acrylic acid ester.

From the viewpoint of adjusting the Young's modulus of the primary resin layer, the urethane oligomer may have a number-average molecular weight of 5,000 to 40,000.

An optical fiber according to an aspect of the present disclosure includes a glass fiber including a core and a cladding, a primary resin layer coating the glass fiber so as to be in contact with the glass fiber, and a secondary resin layer coating the primary resin layer. The primary resin layer includes a cured product of the resin composition. Since such an optical fiber can suppress defects of the primary resin layer and delamination between the glass fiber and the primary resin layer, it is possible to suppress an increase in transmission loss at a low temperature and it has excellent productivity.

A method for producing an optical fiber according to an aspect of the present disclosure includes applying the resin composition to an outer periphery of a glass fiber including a core and a cladding, and curing the resin composition by irradiation with ultraviolet rays after the applying. Such a method for producing an optical fiber can produce an optical fiber having excellent productivity.

Details of Embodiments of Present Disclosure

Specific examples of the resin composition and the optical fiber according to the present embodiment will be described with reference to the drawings as necessary. It should be noted that the present disclosure is not limited to these examples, but is defined by the scope of the claims and is intended to include all modifications within the meaning and scope equivalent to the scope of the claims. In the following description, the same elements are denoted by the same reference numerals in the description of the drawings, and redundant description is omitted. The term "(meth)acrylamide group" as used herein means an acrylamide group or a methacrylamide group corresponding thereto. The same applies to other similar expressions such as (meth)acrylate.

Resin Composition

A resin composition according to an embodiment of the present disclosure includes a photopolymerizable compound and a photopolymerization initiator and the photopolymerizable compound includes a urethane oligomer and an N-vinyl compound represented by following formula (I).

The urethane oligomer according to the present embodiment may be any urethane oligomer that can be used as a photopolymerizable compound in a resin composition for primary coating, and is not particularly limited. From the viewpoint of further improving the curing rate of the resin composition, the urethane oligomer preferably has, at least one end of a urethane bond, at least one photopolymerizable group selected from the group consisting of a (meth)acrylamide group and a (meth)acryloyloxy group. From the viewpoint of adjusting the Young's modulus of the primary resin layer, the urethane oligomer may further have at least one group selected from the group consisting of a group based on monohydric alcohol and a group based on an active hydrogen-containing silane compound at the end of the urethane bond.

Examples of the urethane oligomer include an urethane oligomer having (meth)acrylamide groups at both ends of the urethane bond, an urethane oligomer having (meth) acryloyloxy groups at both ends of the urethane bond, an urethane oligomer having a (meth)acrylamide group at one end of the urethane bond and a (meth)acryloyloxy group at the other end, an urethane oligomer having a (meth)acrylamide group or a (meth)acryloyloxy group at one end of the urethane bond and a group based on monohydric alcohol or a group based on an active hydrogen-containing silane compound at the other end, and combinations thereof.

The urethane oligomer may be, for example, a reactant of polyol, diisocyanate, one or more compounds selected from the group consisting of N-hydroxyalkyl (meth)acrylamide and hydroxyl group-containing (meth)acrylate, and if necessary, one or more compounds selected from the group consisting of monohydric alcohol and active hydrogen-containing silane compound. For example, the urethane oligomer having (meth)acrylamide groups at both ends of the urethane bond may be a reactant of polyol, diisocyanate, and N-hydroxyalkyl (meth)acrylamide. The urethane oligomer having (meth)acryloyloxy groups at both ends of the urethane bond may be a reactant of polyol, diisocyanate, and hydroxyl group-containing (meth)acrylate.

Examples of the polyol include polyether polyols, polyester polyols, polycaprolactone polyols, polycarbonate polyols, polybutadiene polyols, and bisphenol A-ethylene oxide adduct diol. Examples of the polyether polyol include polytetramethylene ether glycol, polyethylene glycol, and polypropylene glycol. The polyol may be used alone or in combination of two or more kinds thereof. From the viewpoint of easy adjustment of the Young's modulus and elongation at break of the primary resin layer, at least one selected from the group consisting of polypropylene glycol, polytetramethylene ether glycol, and polycarbonate polyols is preferably used as the polyol.

From the viewpoint of obtaining a Young's modulus suitable for the primary resin layer, the polyol preferably has a number-average molecular weight (Mn) of 2,000 to 20,000, more preferably 2,400 to 19,000, and still more preferably 2,800 to 18,000.

Examples of the diisocyanate include 2,4-tolylene diisocyanate, 2,6-tolylene diisocyanate, isophorone diisocyanate, dicyclohexylmethane diisocyanate, diphenylmethane diisocyanate, hexamethylene diisocyanate, xylylene diisocyanate, hydrogenated xylylene diisocyanate, 1,5-naphthalene diisocyanate, norbornene diisocyanate, 1,5-pentamethylene diisocyanate, tetramethylxylylene diisocyanate, and trimethylhexamethylene diisocyanate. The diisocyanate may be used alone or in combination of two or more kinds thereof.

Examples of the N-hydroxyalkyl (meth)acrylamide include N-hydroxymethyl (meth)acrylamide, N-hydroxyethyl (meth)acrylamide, and N,N-dimethylol (meth)acrylamide. The N-hydroxyalkyl (meth)acrylamide may be used alone or in combination of two or more kinds thereof. From the viewpoint of further improving the curing rate of the resin composition, it is preferable to use N-hydroxyethyl acrylamide as the N-hydroxyalkyl (meth)acrylamide.

Examples of the hydroxyl group-containing (meth)acrylate include 2-hydroxyethyl (meth)acrylate, 2-hydroxypropyl (meth)acrylate, 2-hydroxybutyl (meth)acrylate, caprolactone (meth)acrylate, 2-hydroxy-3-phenoxypropyl (meth) acrylate, 2-(meth)acryloyloxyethyl-2-hydroxyethyl phthalic acid, 2-hydroxy-O-phenylphenolpropyl (meth)acrylate, 2-hydroxy-3-methacrylpropyl acrylate, trimethylolpropane di(meth)acrylate, and pentaerythritol tri(meth)acrylate. The hydroxyl group-containing (meth)acrylate may be used alone or in combination of two or more kinds thereof. As the hydroxyl group-containing (meth)acrylate, it is preferable to use at least one selected from the group consisting of 2-hydroxyethyl (meth)acrylate, 2-hydroxypropyl (meth) acrylate, and 2-hydroxybutyl (meth)acrylate.

Examples of monohydric alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, and 3-methyl-2-butanol. The monohydric alcohol may be used alone or in combination of two or more kinds thereof. In the urethane oligomer, by introducing a group based on monohydric alcohol at the end of the urethane bond, the ratio of a (meth)acrylamide group and a (meth)acryloyloxy group at the end, which is a photopolymerizable group, may be reduced, and the Young's modulus of the primary resin layer may be reduced.

Examples of the active hydrogen-containing silane compound include N-2-(aminoethyl)-3-aminopropyl methyl dimethoxy silane, N-2-(aminoethyl)-3-aminopropyl trimethoxy silane, 3-aminopropyl trimethoxy silane, 3-aminopropyl triethoxy silane, 3-(triethoxysilyl)-N-(1,3-dimethylbutylidene) propylamine, N-phenyl-3-aminopropyl trimethoxy silane, 3-mercaptopropyl methyl dimethoxy silane, and 3-mercaptopropyl trimethoxy silane. The active hydrogen-containing silane compound may be used alone or in combination of two or more kinds thereof. In the urethane oligomer, by introducing a group based on an active hydrogen-containing silane compound at the end of the urethane bond, a (meth)acrylamide group and a (meth)acryloyloxy group at the end, which is a photopolymerizable group, may be reduced, the Young's modulus of the primary resin layer may be reduced and adhesion between the primary resin layer and the glass fiber may be improved.

Examples of the method of synthesizing the urethane oligomer include a method in which a polyol is reacted with a diisocyanate and then reacted with one or more compounds selected from the group consisting of N-hydroxyalkyl (meth)acrylamide and hydroxyl group-containing (meth) acrylate (and optionally one or more compounds selected from the group consisting of monohydric alcohol and active hydrogen-containing silane compound); a method in which a diisocyanate is reacted with one or more compounds selected from the group consisting of N-hydroxyalkyl (meth)acrylamide and hydroxyl group-containing (meth) acrylate (and optionally one or more compounds selected from the group consisting of monohydric alcohol and active hydrogen-containing silane compound)and then reacted with a polyol; and a method in which a polyol, a diisocyanate and one or more compounds selected from the group consisting of N-hydroxyalkyl (meth)acrylamide and hydroxyl group-containing (meth)acrylate (and optionally one or more compounds selected from the group consisting of monohydric alcohol and active hydrogen-containing silane compound) are simultaneously reacted.

When a bifunctional polyol is used, a method is preferred in which the hydroxyl group (OH) of the polyol is reacted with the isocyanate group (NCO) of the diisocyanate, and then reacted with at least one compound selected from the group consisting of N-hydroxyalkyl (meth)acrylamide and hydroxyl group-containing (meth)acrylate (and optionally one or more compounds selected from the group consisting of monohydric alcohol and active hydrogen-containing silane compound). When a polyol having three or more functional groups is used, a method is preferred in which the diisocyanate is reacted with one or more compound selected from the group consisting of N-hydroxyalkyl (meth)acrylamide and hydroxyl group-containing (meth)acrylate (and optionally one or more compounds selected from the group consisting of monohydric alcohol and active hydrogen-containing silane compound), and then reacted with the polyol.

Hereinafter, preparation of the urethane oligomer will be described with reference to specific examples. For example, polypropylene glycol as the polyol, 2,4-tolylene diisocyanate as the diisocyanate, N-hydroxyethyl acrylamide as the N-hydroxyalkyl (meth)acrylamide, 2-hydroxyethyl acrylate as the hydroxyl group-containing (meth)acrylate, methanol as the monohydric alcohol, and 3-mercaptopropyl trimethoxy silane as the active hydrogen-containing silane compound are used.

First, polypropylene glycol and 2,4-tolylene diisocyanate are reacted to synthesize an NCO end prepolymer. Subsequently, the NCO end prepolymer is reacted with N-hydroxyethyl acrylamide, 2-hydroxyethyl acrylate, methanol, and 3-mercaptopropyl trimethoxy silane to synthesize a urethane oligomer. The synthesized urethane oligomer can be represented as a mixture of the following formulas (1) to (7).

$$Am\text{-}(U\text{-}I\text{-}U\text{-}P)n\text{-}U\text{-}I\text{-}U\text{-}Am \quad (1)$$

$$Am\text{-}(U\text{-}I\text{-}U\text{-}P)n\text{-}U\text{-}I\text{-}U\text{-}Ac \quad (2)$$

$$Ac\text{-}(U\text{-}I\text{-}U\text{-}P)n\text{-}U\text{-}I\text{-}U\text{-}Ac \quad (3)$$

$$Am\text{-}(U\text{-}I\text{-}U\text{-}P)n\text{-}U\text{-}I\text{-}U\text{-}M \quad (4)$$

$$Am\text{-}(U\text{-}I\text{-}U\text{-}P)n\text{-}U\text{-}I\text{-}U\text{-}SC \quad (5)$$

$$Ac\text{-}(U\text{-}I\text{-}U\text{-}P)n\text{-}U\text{-}I\text{-}U\text{-}M \quad (6)$$

$$Ac\text{-}(U\text{-}I\text{-}U\text{-}P)n\text{-}U\text{-}I\text{-}U\text{-}SC \quad (7)$$

Here, Am represents a residue of N-hydroxyethyl acrylamide, Ac represents a residue of 2-hydroxyethyl acrylate, M represents a residue of methanol, SC represents a residue of 3-mercaptopropyl trimethoxy silane, U represents a (thio) urethane bond, I represents a residue of 2,4-tolylene diisocyanate, P represents a residue of polypropylene glycol, and n is an integer of one or more.

In the reactant when the urethane oligomer is synthesized, the following formulas (8) to (14) may be contained as by-products. The formulas (8) to (14) are called adduct products and function as one kind of monomer.

$$Am\text{-}U\text{-}I\text{-}U\text{-}Am \quad (8)$$

$$Am\text{-}U\text{-}I\text{-}U\text{-}Ac \quad (9)$$

$$Ac\text{-}U\text{-}I\text{-}U\text{-}Ac \quad (10)$$

$$Am\text{-}U\text{-}I\text{-}U\text{-}M \quad (11)$$

$$Am\text{-}U\text{-}I\text{-}U\text{-}SC \quad (12)$$

$$Ac\text{-}U\text{-}I\text{-}U\text{-}M \quad (13)$$

$$Ac\text{-}U\text{-}I\text{-}U\text{-}SC \quad (14)$$

In the reactant when the urethane oligomer is synthesized, the following formulas (15) to (20) may be contained as by-products. Since formulas (15) to (20) do not have a photopolymerizable group, it is desirable that formulas (15) to (20) are not generated.

$$M\text{-}(U\text{-}I\text{-}U\text{-}P)n\text{-}U\text{-}I\text{-}U\text{-}M \quad (15)$$

$$SC\text{-}(U\text{-}I\text{-}U\text{-}P)n\text{-}U\text{-}I\text{-}U\text{-}SC \quad (16)$$

$$M\text{-}(U\text{-}I\text{-}U\text{-}P)n\text{-}U\text{-}I\text{-}U\text{-}SC \quad (17)$$

$$M\text{-}U\text{-}I\text{-}U\text{-}M \quad (18)$$

$$M\text{-}U\text{-}I\text{-}U\text{-}SC \quad (19)$$

$$SC\text{-}U\text{-}I\text{-}U\text{-}SC \quad (20)$$

When preparing the urethane oligomer, the addition of methanol and 3-mercaptopropyl trimethoxy silane is optional, and when methanol and 3-mercaptopropyl trimethoxy silane are not added, a mixture of the formulas (1) to (3) is produced as a main component, and a mixture of the formulas (8) to (10) is produced as a by-product.

The molar ratio of NCO to OH (NCO/OH) when polyol and diisocyanate are reacted is preferably 1.1 to 4.0, more preferably 1.2 to 3.5, and still more preferably 1.4 to 3.0. The molar ratio of N-hydroxyalkyl (meth)acrylamide to NCO in the NCO end prepolymer is preferably 0.1 to 1.15, more preferably 0.2 to 1.10. The molar ratio of the hydroxyl group-containing (meth)acrylate to NCO in the NCO end prepolymer is preferably 0.1 to 1.15, more preferably 0.2 to 1.10. The molar ratio of the total of N-hydroxyalkyl (meth) acrylamide, hydroxyl group-containing (meth)acrylate, monohydric alcohol, and active hydrogen-containing silane compound to NCO in the NCO end prepolymer is preferably 1.00 to 1.15, more preferably 1.03 to 1.10. The molar ratio of the total of monohydric alcohol and active hydrogen-containing silane compound to NCO in the NCO end prepolymer is preferably 0 to 0.5.

Examples of the catalyst for synthesizing the urethane oligomer include an organotin compound and an amine compound. Examples of the organotin compound include dibutyltin dilaurate, dibutyltin diacetate, dibutyltin maleate, dibutyltin bis (2-ethylhexyl mercaptoacetate), dibutyltin bis (isooctyl mercaptoacetate), and dibutyltin oxide. From the viewpoint of easy availability or catalyst performance, dibutyltin dilaurate or dibutyltin diacetate is preferably used as the catalyst.

From the viewpoint of further enhancing the photocurability of the resin composition, the content of the urethane oligomer is preferably 10 parts by mass to 90 parts by mass, more preferably 20 parts by mass to 90 parts by mass, still more preferably 30 parts by mass to 90 parts by mass, and particularly preferably 40 parts by mass to 80 parts by mass based on 100 parts by mass of the total amount of the resin composition.

The Mn of the urethane oligomer is preferably 5,000 to 40,000, more preferably 8,000 to 38,000, and still more preferably 10,000 to 37,000 from the viewpoint of obtaining the Young's modulus suitable for the primary resin layer.

The N-vinyl compound represented by the following formula (I) according to the present embodiment is a photopolymerizable monomer having no urethane bond. Since the resin composition according to the present embodiment includes the N-vinyl compound represented by Formula (I), the curing rate is high, and defects in the formed primary resin layer and delamination between the glass fiber and the primary resin layer may be suppressed. Therefore, it can be suitably used as a resin composition for primary coating of an optical fiber and can improve productivity of the optical fiber.

[Chemical Formula 1]

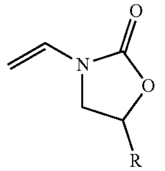

(I)

In the formula (I), R represents an alkyl group having 1 to 5 carbon atoms. From the viewpoint of further improving the curing rate of the resin composition, R is preferably an alkyl group having 1 to 3 carbon atoms, more preferably a methyl group or an ethyl group, and still more preferably a methyl group.

Examples of the N-vinyl compound represented by the formula (I) include N-vinylmethyloxazolidinone (manufactured by BASF, trade name: VMOX).

The content of the N-vinyl compound represented by the formula (I) is preferably 1 part by mass to 30 parts by mass based on 100 parts by mass of the total amount of the resin composition. When the content of the N-vinyl compound represented by Formula (I) is 1 part by mass or more based on 100 parts by mass of the total amount of the resin composition, the curing rate of the resin composition tends to be further improved, and when the content thereof is 30 parts by mass or less, the viscosity of the resin composition tends to be appropriately adjusted. The content of the N-vinyl compound represented by the formula (I) may be 2 parts by mass or more, 3 parts by mass or more, 4 parts by mass or more, 5 parts by mass or more, 6 parts by mass or more, 7 parts by mass or more or 8 parts by mass or more, and may be 25 parts by mass or less, 22 parts by mass or less, 20 parts by mass or less, 18 parts by mass or less, 15 parts by mass or less, 13 parts by mass or less or 11 parts by mass or less.

The photopolymerizable compound according to the present embodiment may further includes a (meth)acrylic acid ester from the viewpoint of adjusting the Young's modulus of the primary resin layer. The photopolymerizable compound according to the present embodiment may further include a (meth)acrylamide compound from the viewpoint of further improving the curing rate of the resin composition.

Examples of the (meth)acrylic acid ester include a monofunctional (meth)acrylic acid ester and a polyfunctional (meth)acrylic acid ester. Examples of the monofunctional (meth)acrylic acid ester include methyl (meth)acrylate, ethyl (meth)acrylate, propyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth) acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth) acrylate, lauryl (meth)acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth) acrylate (for example, trade name "ARONIX M-113" manufactured by TOAGOSEI CO., LTD.), nonylphenoxypolyethylene glycol (meth)acrylate, isobornyl (meth)acrylate, 3-phenoxybenzyl (meth)acrylate, methylphenoxy ethyl (meth)acrylate, phenoxydiethylene glycol (meth)acrylate, phenoxypolyethylene glycol (meth)acrylate, m-phenoxybenzyl (meth)acrylate, 2-(2-ethoxyethoxy)ethyl (meth)acrylate, 2-hydroxy-3-phenoxypropyl acrylate, carboxyethyl (meth)acrylate, carboxypentyl (meth)acrylate, and ω-carboxypolycaprolactone (meth)acrylate.

Examples of polyfunctional (meth)acrylic acid esters include bifunctional (meth)acrylic acid esters such as ethylene glycol di(meth)acrylate, polyethylene glycol di(meth) acrylate, polypropylene glycol di(meth)acrylate, neopentyl glycol di(meth)acrylate, tripropylene glycol di(meth)acrylate, triethylene glycol di(meth)acrylate, cyclohexane dim ethanol di(meth)acrylate, dipropylene glycol di(meth)acrylate, tetraethylene glycol di(meth)acrylate, hydroxypivalate neopentyl glycol di(meth)acrylate, 1,3-butylene glycol di(meth)acrylate, 1,4-butanediol di(meth)acrylate, diethylene glycol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-haxadecanediol di(meth)acrylate, 1,20-eicosanediol di(meth)acrylate, isopentyldiol di(meth)acrylate, 3-ethyl-1, 8-octanediol di(meth)acrylate, tricyclodecanol di(meth) acrylate, 9,9-bis [4-(2-hydroxyethoxy)phenyl] fluorene di(meth)acrylate, bisphenol A-epoxy di(meth)acrylate, bisphenol F-epoxy di(meth)acrylate, bisphenol A-ethylene oxide adduct di(meth)acrylate, bisphenol F-ethylene oxide adduct di(meth)acrylate, bisphenol A-propylene oxide adduct di(meth)acrylate, and bisphenol F-propylene oxide adduct di(meth)acrylate, and difunctional (meth)acrylic acid esters such as the trade names "EPOXY ESTER 40EM", "EPOXY ESTER 70PA", "EPOXY ESTER 200PA", and "EPOXY ESTER 80MFA" produced by Kyoeisha Chemical Co., Ltd.; and (meth)acrylic acid esters having three or more functional groups such as trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra (meth)acrylate, pentaerythritol tetra (meth) acrylate, ditrimethylolpropane tetra(meth)acrylate, dipentaerythritol tetra(meth)acrylate, dipentaerythritol penta (meth)acrylate, dipentaerythritol hexa(meth)acrylate, and caprolactone-modified tris [(meth)acryloyloxyethyl] isocyanurate.

The (meth)acrylic acid ester may be used alone or in combination of two or more kinds thereof. The content of the (meth)acrylic acid ester is preferably 0 parts by mass to 60 parts by mass, more preferably 3 parts by mass to 40 parts by mass, and still more preferably 5 parts by mass to 30 parts by mass based on 100 parts by mass of the total amount of the resin composition.

Examples of the (meth)acrylamide compound include dimethyl (meth)acrylamide, diethyl (meth)acrylamide, (meth)acryloylmorpholine, hydroxymethyl (meth)acrylamide, hydroxyethyl (meth)acrylamide, isopropyl (meth)acrylamide, dimethylaminopropyl (meth)acrylamide, dimethylaminopropylacrylamide-methyl chloride salt, diacetone acrylamide, (meth)acryloylpiperidine, (meth)acryloylpyrrolidine, (meth)acrylamide, N-hexyl (meth)acrylamide, N-methyl (meth)acrylamide, N-butyl (meth)acrylamide, N-methylol (meth)acrylamide, and N-methylolpropane (meth)acrylamide.

The (meth)acrylamide compound may be used alone or in combination of two or more kinds thereof. The content of the (meth)acrylamide compound is preferably 0 parts by mass to 30 parts by mass, more preferably 1 part by mass to 20 parts by mass, and still more preferably 5 parts by mass to 15 parts by mass based on 100 parts by mass of the total amount of the resin composition.

The photopolymerization initiator according to the present embodiment can be appropriately selected from known radical photopolymerization initiators and used. Examples of the photopolymerization initiator include 1-hydroxycyclohexyl phenyl ketone (trade name: Omnirad 184, manufactured by IGM Resins), 2,2-dimethoxy-2-phenyl acetophenone (trade name: Omnirad 651, manufactured by IGM Resins), 2,4,6-trimethylbenzoyl diphenylphosphine oxide (trade name: Omnirad TPO, manufactured by IGM Resins), ethyl (2,4,6-trimethylbenzoyl)-phenyl phosphinate (trade name: Omnirad TPO-L, manufactured by IGM Resins), 2-benzoyl-2-dimethylamino-4'-morpholinobutyrophenone (trade name: Omnirad 369, manufactured by IGM Resins), 2-dimethylamino-2-(4-methylbenzyl)-1-(4-morpholin-4-yl-phenyl)-butan-1-one (trade name: Omnirad 379, manufactured by IGM Resins), bis (2,4,6-trimethylbenzoyl)phenylphosphine oxide (trade name: Omnirad 819, manufactured by IGM Resins), and 2-methyl-1-[4-(methylthio) phenyl]-2-morpholinopropan-1-one (trade name: Omnirad 907, manufactured by IGM Resins).

The photopolymerization initiator may be used alone or in combination of two or more kinds thereof. From the viewpoint of more excellent rapid curability of the resin composition, the photopolymerization initiator preferably contain 2,4,6-trimethylbenzoyl diphenylphosphine oxide.

The content of the photopolymerization initiator is preferably 0.2 parts by mass to 5 parts by mass, more preferably 0.3 parts by mass to 4 parts by mass, and still more preferably 0.4 parts by mass to 3 parts by mass based on 100 parts by mass of the total amount of the resin composition.

The resin composition according to the present embodiment may further contain a silane coupling agent, a photoacid generator, a leveling agent, an antifoaming agent, an antioxidant, an ultraviolet absorber, and the like.

Examples of the silane coupling agent include tetramethylsilicate, tetraethylsilicate, mercaptopropyl trimethoxysilane, vinyltrichlorosilane, vinyltriethoxysilane, vinyltris(β-methoxy-ethoxy) silane, β-(3,4-bepoxycyclohexyl)-ethyltrimethoxysilane, dimethoxydimethylsilane, diethoxydimethylsilane, 3-acryloxypropyl trimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl) propyl] tetrasulfide, bis[3-(triethoxysilyl) propyl] disulfide, γ-trimethoxysilylpropyldimethylthiocarbamyltetrasulfide, and γ-trimethoxysilylpropylbenzothiazyltetrasulfide. The silane coupling agent may be used alone or in combination of two or more kinds thereof.

The content of the silane coupling agent is preferably 0 part by mass to 10 parts by mass, more preferably 0.2 parts by mass to 5 parts by mass, still more preferably 0.3 parts by mass to 4 parts by mass, and particularly preferably 0.4 parts by mass to 3 parts by mass based on 100 parts by mass of the total amount of the resin composition.

An onium salt having a structure of $A^+B^-$ may be used as the photoacid generator. Examples of the photoacid generator include sulfonium salts such as CPI-100P and 110P (produced by San-Apro Ltd.), Omnicat 270 and Omnicat 290 (produced by IGM Resins B.V.); and iodonium salts such as Omnicat 250 (produced by IGM Resins B.V.), WPI-113, WPI-116, WPI-124, WPI-169 and WPI-170 (produced by FUJIFILM Wako Pure Chemical Corporation).

The viscosity of the resin composition according to the present embodiment at 25° C. is preferably 0.5 Pa·s to 10 Pa·s and more preferably 1 Pa·s to 9 Pa·s from the viewpoint of coating properties. The viscosity of the resin composition at 25° C. can be measured using a B-type viscosimeter ("Digital Viscosimeter DV-II" manufactured by Brookfield Engineering Laboratories, Inc.) under the conditions of spindle: No. 18 and rotational speed 10 rpm.

(Optical Fiber)

An optical fiber according to the present embodiment includes a glass fiber including a core and a cladding, a primary resin layer coating the glass fiber so as to be in contact with the glass fiber; and a secondary resin layer coating the primary resin layer.

FIG. 1 is a schematic cross-sectional view showing an example of an optical fiber according to the present embodiment. An optical fiber 10 includes a glass fiber 13 including a core 11 and a cladding 12, and a coating resin layer 16 including a primary resin layer 14 provided on the outer periphery of glass fiber 13 and a secondary resin layer 15 covering primary resin layer 14.

Cladding 12 surrounds core 11. Core 11 and cladding 12 mainly contain glass such as silica glass, and for example, germanium-added silica glass or pure silica glass can be used for core 11, and pure silica glass or fluorine-added silica glass can be used for cladding 12.

In FIG. 1, for example, the outside diameter (D2) of glass fiber 13 is about 100 μm to about 125 μm, and the outside diameter (D1) of core 11 constituting glass fiber 13 is about 7 μm to about 15 μm. The thickness of coating resin layer 16 is usually about 22 μm to about 70 μm. The thickness of each of primary resin layer 14 and secondary resin layer 15 may be about 5 μm to about 50 μm.

When the outer diameter of glass fiber 13 is about 125 μm and the thickness of coating resin layer 16 is 60 μm to 70 μm, the thickness of each of primary resin layer 14 and secondary resin layer 15 may be about 10 μm to about 50 μm. For example, the thickness of primary resin layer 14 may be 35 μm and the thickness of secondary resin layer 15 may be 25 μm. The outer diameter of optical fiber 10 may be about 245 μm to about 265 μm.

When the outer diameter of glass fiber 13 is about 125 μm and the thickness of coating resin layer 16 is 24 μm to 48 μm, the thickness of each of primary resin layer 14 and secondary resin layer 15 may be about 8 μm to about 38 μm. For example, the thickness of primary resin layer 14 may be 25 μm and the thickness of secondary resin layer 15 may be 10 μm. The outer diameter of optical fiber 10 may be about 173 μm to about 221 μm.

When the outer diameter of glass fiber 13 is about 100 μm and the thickness of coating resin layer 16 is 22 μm to 37 μm, the thickness of each of primary resin layer 14 and secondary resin layer 15 may be about 5 μm to about 32 μm. For example, the thickness of primary resin layer 14 may be 25 μm and the thickness of secondary resin layer 15 may be 10 μm. The outer diameter of optical fiber 10 may be about 144 μm to about 174 μm.

Primary resin layer 14 includes a cured product of the resin composition according to the present embodiment. Primary resin layer 14 may be obtained by curing the resin composition according to the present embodiment. Since such primary resin layer 14 can suppress defects and delamination between primary resin layer 14 and the glass fiber, an increase in transmission loss of the optical fiber at low temperatures can be suppressed, and an optical fiber having excellent productivity can be manufactured.

It is preferable that the Young's modulus of primary resin layer 14 be 0.8 MPa or less at 23° C.±2° C., it is more preferable that the Young's modulus be 0.5 MPa or less at 23° C.±2° C. from the viewpoint of improving the microbending resistance of the optical fiber. When the Young's modulus of the primary resin layer exceeds 0.8 MPa, an external force is easily transmitted to the glass fiber, and the transmission loss due to microbending tends to increase.

The Young's modulus of primary resin layer 14 may be measured by a Pullout Modulus (POM) method at 23° C. Two portions of the optical fiber are fixed by two clamping devices, portions of the coating resin layer (the primary resin layer and the secondary resin layer) between the two clamping devices are removed, then one clamping device is fixed, and the other clamping device is slowly moved in a direction opposite to the fixed clamping device. The Young's modulus of the primary resin layer can be obtained from the following equation, where L is the length of the portion of the optical fiber held by the two chuck devices to be moved, Z is the amount of movement of the chuck, Dp is the outer diameter of the primary resin layer, Df is the outer diameter of the glass fiber, n is the Poisson's ratio of the primary resin layer, and W is the load during movement of the chuck device.

$$\text{Young's modulus (MPa)}=((1+n)W/\pi LZ)\times \ln (Dp/Df)$$

Secondary resin layer 15 may be formed by curing a resin composition containing a photopolymerizable compound including a urethane oligomer, a photopolymerization initiator, and the like. The photopolymerizable compound and the photopolymerization initiator are not particularly limited, and may be selected from the above-described photopolymerizable compounds and photopolymerization initiators, and used. The resin composition forming the secondary resin layer has a different composition from the resin composition for primary coating. The resin composition for secondary coating can be prepared using conventionally known techniques. The urethane oligomer for the secondary resin layer may be, for example, a reactant of polyol, diisocyanate, and N-hydroxyalkyl (meth)acrylamide, or a reactant of polyol, diisocyanate, and hydroxyl group-containing (meth)acrylate.

It is preferable that the Young's modulus of secondary resin layer 15 be 800 MPa or more at 23° C.±2° C., it is more preferable that the Young's modulus be 1000 MPa or more at 23° C.±2° C., and it is further preferable that the Young's modulus be 1200 MPa or more at 23° C.±2° C. from the viewpoint of improving the microbending resistance of the optical fiber. Although the upper limit of the Young's modulus of secondary resin layer 15 is not particularly limited, the upper limit may be 3000 MPa or less, 2500 MPa or less, or 2000 MPa or less at 23° C.±2° C. from the viewpoint of imparting moderate toughness to the secondary resin layer.

The Young's modulus of secondary resin layer 15 can be measured by the following method. First, the optical fiber is immersed in a mixed solvent of acetone and ethanol, and only the coating resin layer is drawn out in a cylindrical shape. Although the primary resin layer and the secondary resin layer are united at this time, the Young's modulus of the primary resin layer is 1/1000 to 1/10000 of the Young's modulus of the secondary resin layer, the Young's modulus of the primary resin layer is therefore negligible. Next, the solvent is removed from the coating resin layer by vacuum drying, a tensile test (the tensile speed is 1 mm/minute) can be performed at 23° C., and the Young's modulus can be calculated by a secant expression at 2.5% strain.

From the viewpoint of improving the heat resistance of secondary resin layer 15, the Tg of secondary resin layer 15 is preferably 70° C. or higher, and more preferably 75° C. or higher. From the viewpoint of suppressing an increase in transmission loss of the optical fiber at a low temperature, the Tg of secondary resin layer 15 is preferably 105° C. or lower, and more preferably 95° C. or lower.

The method for producing an optical fiber according to the present embodiment includes applying the resin composition according to the present embodiment to an outer periphery of a glass fiber including a core and a cladding, and curing the resin composition by irradiation with ultraviolet rays after the applying. In the method for producing an optical fiber according to the present embodiment, since the resin composition according to the present embodiment is used as a resin composition for primary coating, defects of a primary resin layer to be formed and delamination between the glass fiber and the primary resin layer may be suppressed, and an optical fiber having excellent productivity may be manufactured.

EXAMPLES

Hereinafter, results of evaluation tests using Examples and Comparative Examples according to the present disclosure are shown, and the present disclosure will be described in more detail. Note that the present disclosure is not limited to these examples.

Synthesis of Urethane Oligomer (A-1)

Polypropylene glycol having a Mn of 3000 (PPG3000, manufactured by SANYO CHEMICAL INDUSTRIES, LTD., trade name: Sannix PP-3000) and 2,4-tolylene diisocyanate (TDI) were mixed such that the molar ratio of NCO to OH (NCO/OH) was adjusted to 1.5 and reacted at 60° C. for 1 hour to prepare an NCO end prepolymer. As catalysts, dibutyltin dilaurate was added by 200 ppm with respect to the final total fed amount. Next, 2-hydroxyethyl acrylate (HEA) was added so that the molar ratio of OH of HEA to NCO of the NCO end prepolymer (HEA/NCO) was 1.05, and reacted at 60° C. for 1 hour to obtain urethane oligomer (A-1) having a Mn of 11300.

(A-2)

Urethane oligomer (A-2) having a Mn of 11200 was obtained in the same manner as in the synthesis of (A-1) except that methanol was added so that the molar ratio of OH of methanol to NCO of the NCO end prepolymer (MeOH/NCO) was 0.4, and HEA was added so that the molar ratio of OH of HEA to NCO of the NCO end prepolymer (HEA/NCO) was 0.65.

(A-3)

Urethane oligomer (A-3) having a Mn of 11400 was obtained in the same manner as in the synthesis of (A-1) except that HEA was added so that the molar ratio of OH of HEA to NCO of the NCO end prepolymer (HEA/NCO) was 0.8, methanol was added so that the molar ratio of OH of methanol to NCO of the NCO end prepolymer (MeOH/NCO) was 0.2, and 3-mercaptopropyl trimethoxy silane (MPTS) was added so that the molar ratio of MPTS to NCO of the NCO end prepolymer (MPTS/NCO) was 0.05.

(A-4)

Urethane oligomer (A-4) having a Mn of 11400 was obtained in the same manner as in the synthesis of (A-1) except that N-hydroxyethyl acrylamide (HEAA) was added so that the molar ratio of OH of HEAA to NCO of the NCO end prepolymer (HEAA/NCO) was 1.05.

(A-5)

Urethane oligomer (A-5) having a Mn of 36500 was obtained in the same manner as in the synthesis of (A-1) except that polypropylene glycol having a Mn of 18000 (manufactured by AGC Co., Ltd., trade name: PREMINOL S4318F) and TDI were blended so that NCO/OH was 2.0.

(Z-1)

Polypropylene glycol having a Mn of 600 (PPG600, manufactured by SANYO CHEMICAL INDUSTRIES, LTD., trade name: Sannix PP-600) and TDI were blended so that the molar ratio of NCO to OH (NCO/OH) was 2, and reacted at 60° C. for 1 hour to prepare an NCO end prepolymer. As catalysts, dibutyltin dilaurate was added to the final total charge by 200 ppm addition. Next, HEA was added so that the molar ratio of OH of HEA to NCO of the NCO end prepolymer was 1.05, and reacted at 60° C. for 1 hour to obtain urethane oligomer (Z-1) having a Mn of 2200.

Mn of polyol is a value described in a catalog of each product. Mn of the urethane oligomer was measured using an ACQUITY APC RI system manufactured by Waters under the following conditions: sample concentration: 0.2 mass % in THF, injection volume: 20 μL, sample temperature: 15° C., mobile phase: THF, XT column for organic solvents: particle size 2.5 μm, pore size 450Å, column internal diameter 4.6× column length 150 mm+ particle size 2.5 μm, pore size 125Å, column internal diameter 4.6× column length 150 mm+ particle size 1.7 μm, pore size 45Å, column internal diameter 4.6× column length 150 mm, column temperature: 40° C., flow rate: 0.8 mL/min.

Resin Composition for Primary Coating

N-vinylmethyloxazolidinone was prepared as an N-vinyl compound represented by formula (I), acryloyl morpholine was prepared as a (meth)acrylamide compound, nonylphenol EO-modified acrylate (manufactured by TOAGOSEI CO., LTD., trade name: Aronix M-113) was prepared as a (meth)acrylic acid ester, 2,4,6-trimethylbenzoyl diphenylphosphine oxide (Omnirad TPO) was prepared as a photopolymerization initiator, and 3-acryloxypropyl trimethoxysilane was prepared as a silane coupling agent. Each component was mixed in the blending amount (parts by mass) shown in the following Table 1 to obtain a resin composition for primary coating of each Example and Comparative Example.

Resin Composition for Secondary Coating

A resin composition for secondary coating was obtained by mixing 25 parts by mass of urethane oligomer (Z-1), 36 parts by mass of tripropyleneglycoldiacrylate (manufactured by OSAKA ORGANIC CHEMICAL INDUSTRY LTD., trade name: Viscoat #310-HP), 37 parts by mass of bisphenol A-epoxy di(meth)acrylate (manufactured by OSAKA ORGANIC CHEMICAL INDUSTRY LTD., trade name: Viscoat #540), 1 part by mass of Omnirad TPO, and 1 part by mass of Omnirad 184.

Production of Optical Fiber

The resin composition for primary coating and the resin composition for secondary coating were applied to an outer circumferential surface of glass fiber 13 having a diameter of 125 μm. Then, each resin composition was cured by irradiation with ultraviolet rays to form coating resin layer 16 including primary resin layer 14 and secondary resin layer 15, thereby producing optical fiber 10. The thickness of primary resin layer 14 was 35 μm, and the thickness of secondary resin layer 15 was 25 μm. The optical fibers were produced by varying the linear velocities of 2500 m/min, 3000 m/min and 3500 m/mm.

Low Temperature Characteristics

The optical fiber was wound around the glass bobbin in a single layer with a tensile force 50 g, and the transmission characteristics of the signal light having the wave length 1550 nm were measured under the temperature conditions of 23° C. and −40° C. to obtain the transmission loss at 23° C. and −40° C. A case where the transmission loss difference obtained by subtracting the transmission loss at 23° C. from the transmission loss at −40° C. was less than 0 dB/km was evaluated as “A”, a case where the transmission loss difference was 0 dB/km to 0.01 dB/km was evaluated as “B”, and a case where the transmission loss difference was more than 0.01 dB/km was evaluated as “C”.

TABLE 1

| | | | Example 1 | Example 2 | Example 3 | Example 4 | Example 5 | Example 6 | Example 7 | Comparative Example1 |
|---|---|---|---|---|---|---|---|---|---|---|
| Resin composition for primary coating | A-1 | | 70 | — | — | — | — | — | 70 | 70 |
| | A-2 | | — | 70 | — | — | — | — | — | — |
| | A-3 | | — | — | 70 | — | — | — | — | — |
| | A-4 | | — | — | — | 70 | — | 70 | — | — |
| | A-5 | | — | — | — | — | 50 | — | — | — |
| | N-vinylmethyloxazolidinone | | 10 | 10 | 10 | 10 | 28 | 3 | 10 | — |
| | Acryloyl morpholine | | — | — | — | — | — | — | 10 | — |
| | Aronix M-113 | | 18 | 18 | 18 | 18 | 20 | 25 | 8 | 28 |
| | Omnirad TPO | | 1 | 1 | 1 | 1 | 1 | 1 | 1 | 1 |
| | 3-Acryloxypropyl trimethoxysilane | | 1 | 1 | 1 | 1 | 1 | 1 | 1 | 1 |
| Evaluation of optical fiber | Low temperature characteristics | 2500 m/min | A | A | A | A | A | A | A | B |
| | | 3000 m/min | A | A | A | A | A | A | A | C |
| | | 3500 m/min | A | A | A | A | A | A | A | C |

REFERENCE SIGNS LIST

10 Optical fiber
11 Core
12 Cladding
13 Glass fiber
14 Primary resin layer
15 Secondary resin layer
16 Coating resin layer

The invention claimed is:

1. A resin composition for primary coating of an optical fiber, the resin composition comprising:

a photopolymerizable compound and a photopolymerization initiator, wherein the photopolymerizable compound includes a urethane oligomer and an N-vinyl compound represented by the formula (I) below:

[Chemical Formula 1]

(I)

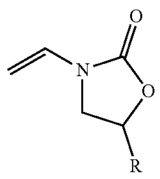

(where R represents an alkyl group having 1 to 5 carbon atoms), and wherein the urethane oligomer contains a urethane oligomer having at least one group selected from the group consisting of a group based on monohydric alcohol and a group based on an active hydrogen-containing silane compound at at least one end of the urethane bond.

2. The resin composition according to claim 1, wherein the N-vinyl compound represented by the formula (I) includes an N-vinyl methyl oxazolidinone.

3. The resin composition according to claim 1, wherein a content of the N-vinyl compound represented by the formula (I) is 1 part by mass to 30 parts by mass based on 100 parts by mass of a total amount of the resin composition.

4. The resin composition according to claim 1, wherein the urethane oligomer has, at least one end of a urethane bond, at least one photopolymerizable group selected from the group consisting of a (meth)acrylamide group and a (meth)acryloyloxy group, and wherein the urethane oligomer having the at least one photopolymerizable group is the urethane oligomer which contains the urethane oligomer having the at least one group selected from the group consisting of the group based on monohydric alcohol and the group based on the active hydrogen-containing silane compound at the at least one end of the urethane bond.

5. The resin composition according to claim 1, wherein the photopolymerizable compound further includes a (meth) acrylic acid ester.

6. The resin composition according to claim 1, wherein the urethane oligomer has a number-average molecular weight of 5,000 to 40,000, and wherein the urethane oligomer having the number-average molecular weight of 5,000 to 40,000 is the urethane oligomer which contains the urethane oligomer having the at least one group selected from the group consisting of the group based on monohydric alcohol and the group based on the active hydrogen-containing silane compound at the at least one end of the urethane bond.

7. An optical fiber comprising:

a glass fiber including a core and a cladding;

a primary resin layer coating the glass fiber so as to be in contact with the glass fiber; and a secondary resin layer coating the primary resin layer, wherein the primary resin layer includes a cured product of the resin composition according to claim 1.

8. A method for producing an optical fiber, the method comprising:

applying the resin composition according to claim 1 to an outer periphery of a glass fiber including a core and a cladding; and curing the resin composition by irradiation with ultraviolet rays after the applying.

* * * * *